Patented June 6, 1950

2,510,423

UNITED STATES PATENT OFFICE 2,510,423

METHOD OF PRODUCING ALKYL ESTERS OF ALPHA-BETA UNSATURATED MONOCARBOXYLIC ACIDS FROM A BETA-LACTONE AND AN ALCOHOL

Forrest W. Shaver, Akron, Ohio, assignor to The B. F. Goodrich Company, New York, N. Y., a corporation of New York No Drawing. Application February 9, 1948, Serial No. 7,298

6 Claims. (Cl. 260—486)

This invention relates to an improved method of producing alkyl esters of alpha-beta unsaturated monocarboxylic acids from a beta-lactone and an alcohol, and relates particularly to the continuous production of alkyl acrylates in high yield by continuous addition of beta-propiolactone and an alkanol to a heated solution of an alkyl sulfuric acid.

It is disclosed in U. S. Patent 2,352,641 that beta-alkoxy monocarboxylic acids may be prepared by reacting a beta-lactone with a monohydric alcohol. It is further disclosed in U. S. Patent 2,376,704 that when a dehydration catalyst such as sulfuric acid is added to a refluxing mixture of a beta-lactone and an alcohol, and the mixture then distilled, an ester of an alpha-beta unsaturated monocarboxylic acid is obtained, the beta-alkoxy acid being only an unisolated intermediate, if formed at all, in the reaction. This reaction may be formulated as follows:

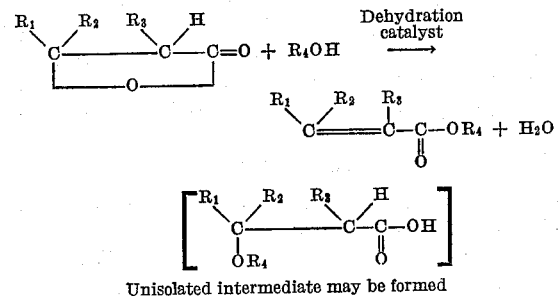

Unisolated intermediate may be formed wherein $R_1$, $R_2$, and $R_3$ represent hydrogen or hydrocarbon groups and $R_4$ represents an alkyl radical.

It has been found, however, that this method of procedure results in relatively low yields of the ester and is not well suited for use on an industrial scale.

I have now discovered that when a mixture of the alcohol and the beta-lactone is added continuously to a heated aqueous solution of an alkyl sulfuric acid, an alpha-beta unsaturated monocarboxylic acid ester is immediately formed and is continuously removed by vaporization from the alkyl sulfuric acid. In this way, the ester is secured efficiently and economically and in very high yield.

The beta-lactone employed may be any compound of the formula

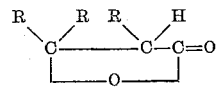

wherein each R is hydrogen or a hydrocarbon radical, including saturated aliphatic beta-lactones such as beta-propiolactone, beta-butyrolactone, alpha-methyl-beta-propiolactone, n-valerolactone, alpha-methyl-beta-butyrolactone, alpha-ethyl-beta-propiolactone, isovalerolactone, n-caprolactone, alpha-methyl-n-valerolactone, beta-methyl-beta-ethyl propiolactone, alpha-propyl-beta-propiolactone, alpha-butyl-beta-propiolactone, or the like and also such beta-lactones as beta-phenyl-beta-propiolactone, alpha-phenyl-beta-propiolactone, beta-benzyl-beta-propiolactone, beta-cyclohexyl-beta-propiolactone, and the like, and other beta-lactones of the nature hereinabove set forth.

The alcohol which is reacted with the lactone may be any monohydric alcohol such as methyl alcohol, ethyl alcohol, isopropyl alcohol, propyl alcohol, allyl alcohol, methyl-ethyl-carbinol, methyl-n-propyl carbinol, tertiary-amyl alcohol, hexyl alcohol, n-heptyl alcohol, n-octyl alcohol, lauryl alcohol, myristyl alcohol, palmityl alcohol, cyclohexanol, benzyl alcohol, phenyl-ethyl alcohol, ethoxy ethanol, chloro-ethyl alcohol, terpineol or the like.

The preferred compounds to be used in the practice of this invention are the saturated aliphatic beta-lactones, especially beta-propiolactone, and the saturated alkyl alcohols. Accordingly, preferred embodiments of this invention include the reaction of beta-propiolactone with methyl, ethyl, propyl or butyl alcohol in the presence of a dehydration catalyst to yield methyl, ethyl, propyl or butyl acrylate.

In the practice of the invention, a mixture of the beta-lactone with the monohydric alcohol (preferably in proportions of 1 mole of lactone to 1.5 moles of alcohol although any desired proportions may be used) is proportioned into a reactor containing a heated alkyl sulfuric acid, preferably in a molecular amount substantially equivalent to that of the lactone. The reactor is equipped with a distilling column through which the ester is removed as it is formed. It is desirable that a substance be present which prevents the polymerization of the ester formed. Suitable substances for this purpose are copper, copper salts, hydroquinone, tertiary butyl catechol, phenyl beta-naphthylamine, sulfur or other polymerization inhibitors. The use of sulfur is particularly desirable in that it may be used as a packing for the distilling column and because of its very slight solubility in acrylates it may be also used effectively to stabilize the acrylate until it is used.

It has also been found that small amounts (0.5% or less by weight based on the total amount of reactants of 3.0% or even more) of ferrous sulfate enables the reaction to be carried out at a lower temperature and with considerably higher yield.

The temperature at which the reaction is conducted depends, of course, on the particular reactants used, it being necessary that the temperature to which the alkyl sulfuric acid is heated be such that the alpha-beta unsaturated monocarboxylic acid ester separates from the reaction mixture in the gaseous form. Thus, for example, in the preparation of lower alkyl acrylates, it is desirable that temperatures of from 100 to 200° C. be maintained.

Vapors of the alpha-beta unsaturated monocarboxylic acid ester and unreacted alcohol which are continuously formed pass into a distilling column and are collected in a receiver which is preferably cooled in an ice bath. The alcohol may be partially separated from the ester by distillation, but a product of higher purity is obtained by adding a substance to the receiver which forms a constant boiling binary mixture with the alcohol and distilling off this binary to obtain the pure alpha-beta unsaturated monocarboxylic acid ester. The reaction may be continued for indefinite periods of time, but highest yields of pure product are obtained for 25 to 30 hours after which it is desirable to replace the alkyl sulfuric acid.

The entire process may be converted to a continuous basis by providing a means of continuously adding the alkyl sulfuric acid to the reactor. Alternatively, the alcohol beta-lactone mixture may be slowly added to the alkyl sulfuric acid, together with ferrous sulfate and/or sulfur or other inhibitor if present, at normal temperature. The resulting mixture is then pumped through a preheater and flashed into the reactor which is maintained at the reaction temperature and the alpha-beta unsaturated monocarboxylic acid ester collected in the usual way.

The following examples are intended to illustrate the process of this invention. There are, of course, numerous variations and modifications in the procedure which will be apparent to those skilled in the art. All parts are by weight unless otherwise stated.

*Example I*

5 parts of ferrous sulfate are dissolved in 103 parts of concentrated sulfuric acid and added to a mixture of 5 parts of hydroquinone in 64 parts of methanol contained in a reaction flask. Reaction between the methanol and sulfuric acid occurs to form methyl sulfuric acid. The methyl sulfuric acid, containing the ferrous sulfate and hydroquinone, is then heated to 126° to 135° C. with constant stirring and a solution of 64 parts methanol and 144 parts beta-propiolactone are added over a period of 24 hours. Methyl acrylate distills over as it forms with some unreacted methanol and is collected in a receiver containing 5 parts of hydroquinone. The distillate is then distilled through a 24" column filled with ceramic packing. The methyl acrylate distills as a binary with methanol at 62° to 63° C. 50 parts of n-hexane and 50 parts of water are added to the methanol acrylate solution and the solution is distilled. The methanol-n-hexane binary distills at 49 to 50° C. and the water methyl acrylate binary at 70 to 72° C. forming a top layer of methyl acrylate and a lower water layer. The methyl acrylate is decanted and 142.3 parts (82.5%) of substantially pure methyl acrylate ($D_4^{20}$ 0.955, B. P. 80.5° C.) are obtained.

*Example II*

0.6 part of ferrous sulfate, 0.6 part hydroquinone, 16.65 parts concentrated sulfuric acid, and 5.44 parts methanol are charged into a jacketed steel reactor equipped with a turbine stirrer. The resulting methyl sulfuric acid solution is then heated to a temperature of 135° C. and a mixture of 25.0 parts of beta-propiolactone and 15.1 parts of methanol is continuously added to the reactor over a period of 5 hours. As the methyl acrylate forms it distills with some methanol into a glass-lined receiver containing hydroquinone to inhibit the polymerization of the ester. 8.3 parts of n-hexane and 8.3 parts of water are added to the methanol-methyl acrylate solution and the solution is distilled, a methanol-hexane binary being removed at 49° to 50° C. and a water-acrylate binary distills over in two layers at 70° to 72° C. The water is removed by decantation and 25.1 parts (87.8%) of pure methyl acrylate ($D_4^{20}$ 0.954, B. P. 80.7° C.) are obtained.

*Example III*

A composition containing 72 parts concentrated sulfuric acid, 23 parts methanol, 2.5 parts ferrous sulfate and 2.5 parts hydroquinone are charged into a reactor and heated at 125° to 130° C. 92.1 parts of beta-propiolactone and 83.4 parts of methanol are then pumped into the reactor over a period of 61 hours. Methyl acrylate forms and together with small amounts of methanol continuously passes through a condenser into a receiver. N-hexane was then added to the methanol-acrylate solution and the methanol-n-hexane binary which forms is distilled off and 100.5 parts (95.3%) of substantially pure methyl acrylate are obtained.

*Example IV*

Example III is carried out in a continuous manner by mixing slowly the reaction medium and the reactants at a temperature of approximately 50° C. The resulting solution is then pumped through a preheater, heated to 100° C. and flashed into the reactor which is maintained at 125° to 130° C. where the reaction occurs to form methyl acrylate in yields which are comparable to those obtained by the batch method.

*Example V*

2.5 parts of ferrous sulfate are dissolved in 103 parts of 70% sulfuric acid and this solution is slowly added to 2.5 parts of hydroquinone in 48 parts of ethanol to form ethyl sulfuric acid solution. 432 parts (6 moles) of beta-propiolactone are then mixed with 644 parts (14 moles) of ethanol and this mixture slowly added over a period of 24 hours to the methyl sulfuric acid solution containing ferrous sulfate, and hydroquinone in a reactor which is maintained at a temperature of 135°–145° C. Ethyl acrylate, along with some unreacted ethanol distills off and is collected in a receiver cooled in an ice bath and containing 2.5 parts of hydroquinone. When ethyl acrylate and ethanol cease coming off, the distillate is further distilled through a 24" column packed with ceramic packing. Ethyl acrylate distills as a binary at a temperature of 76° to 78° C. Upon further separation and purification, a 94.5% yield of ethyl acrylate (B. P. 99.7° C., $D_4^{20}$ 0.924) is obtained.

Furthermore, other esters of alpha-beta unsaturated monocarboxylic acids are obtained when other beta-lactones are reacted with monohydric alcohols in accordance with this invention. Thus, for example, when beta-butyrolactone is reacted with ethyl alcohol in the presence of ethyl sulfuric acid, ethyl crotonate is formed, and when alpha-methyl-beta-butyrolactone is reacted with propyl alcohol in the presence of propyl sulfuric acid, a mixture of propyl tiglate and propyl angelate are obtained.

As mentioned hereinabove, utilization of the improved method of this invention results in yields which are much greater than the yields obtained by other methods, for example, by adding a mixture of a dehydration catalyst and an alcohol to a refluxing mixture of the beta-lactone and the alcohol, by which method only relatively small yields are obtained. It can be seen therefore, that the method of this invention is of great importance in the preparation of alkyl esters of alpha-beta unsaturated monocarboxylic acids and especially esters of acrylic acid, which are very useful in the polymeric form in the preparation of impregnating varnishes, lacquers, rods, sheets, and tubes and the like.

Although specific examples are included herein, it is not intended to limit the invention thereto, for numerous modifications will be apparent to those skilled in the art, and are within the scope of the appended claims.

I claim:

1. In a method for preparing an ester of an alpha-beta unsaturated monocarboxylic acid by reacting a beta-lactone having at least one hydrogen atom connected to the alpha carbon atom with a monohydric alcohol in the presence of a dehydration catalyst, the improvement which comprises continuously adding a mixture of the beta-lactone and the monohydric alcohol to a heated solution of an alkyl sulfuric acid, continuously removing vapors of the ester thus formed, and collecting the ester.

2. In a method for preparing an alkyl ester of an alpha-beta unsaturated monocarboxylic acid by reacting a beta-lactone having at least one hydrogen atom connected to the alpha carbon atom with an alkyl alcohol in the presence of a dehydration catalyst, the improvement which comprises continuously adding a mixture of the beta-lactone and the alkyl alcohol to a heated solution of an alkyl sulfuric acid, continuously removing vapors of the ester thus formed, and collecting the ester.

3. In a method of preparing an alkyl ester of acrylic acid by reacting beta-propiolactone with an alkyl alcohol in the presence of a dehydration catalyst, the improvement which comprises continuously adding a mixture of beta-propiolactone and the alkyl alcohol to a heated solution of an alkyl sulfuric acid, continuously removing vapors of the ester thus formed, collecting the ester and unreacted alkyl alcohol in a receiver and separating the ester from the unreacted alkyl alcohol.

4. In a method of preparing methyl acrylate by reacting beta-propiolactone with methyl alcohol in the presence of a dehydration catalyst, the improvement which comprises continuously adding a mixture of beta-propiolactone and the methyl alcohol to a heated solution of methyl sulfuric acid, continuously removing vapors of the ester thus formed, collecting the ester and unreacted alcohol in a receiver, adding n-hexane to the receiver to form a n-hexane-methyl alcohol binary, and distilling off said binary to obtain the methyl acrylate.

5. In a method of preparing methyl acrylate by reacting beta-propiolactone with methyl alcohol in the presence of concentrated sulfuric acid, the improvement which comprises continuously adding a mixture of beta-propiolactone and methyl alcohol to a heated solution containing methyl sulfuric acid, ferrous sulfate, and hydroquinone, collecting methyl acrylate and unreacted methyl alcohol in a receiver, adding n-hexane to the receiver to form a n-hexane-methyl alcohol binary, and distilling off the binary to obtain the methyl acrylate.

6. In a method of preparing ethyl acrylate by reacting beta-propiolactone with ethyl alcohol in the presence of concentrated sulfuric acid, the improvement which comprises continuously adding a mixture of beta-propiolactone and ethyl alcohol to a heated solution containing ethyl sulfuric acid, ferrous sulfate, and hydroquinone, collecting ethyl acrylate and unreacted ethyl alcohol in a receiver, and separating the ester from the unreacted alcohol.

FORREST W. SHAVER.

REFERENCES CITED

The following references are of record in the file of this patent:

UNITED STATES PATENTS

| Number | Name | Date |
| --- | --- | --- |
| 2,056,771 | Crawford | Oct. 6, 1936 |
| 2,100,993 | Bruson | Nov. 30, 1937 |
| 2,244,389 | D'Alelio | June 3, 1941 |
| 2,376,704 | Kung | May 22, 1945 |
| 2,406,561 | Rehberg | Aug. 27, 1946 |